United States Patent
Guerrieri et al.

(10) Patent No.: US 8,446,991 B2
(45) Date of Patent: May 21, 2013

(54) METHOD OF DETECTING A FRAME SYNCHRONIZATION PATTERN OR UNIQUE WORD IN A RECEIVED DIGITAL SIGNAL

(75) Inventors: Lorenzo Guerrieri, Aosta (IT);
Gabriele Dell'amico, Charvensod (IT);
Mara Concolato, Emarese (IT);
Williams Richard Garcia Valverde, Turin (IT)

(73) Assignee: Dora S.p.A., Aosta (IT)

( * ) Notice: Subject to any disclaimer, the term of this patent is extended or adjusted under 35 U.S.C. 154(b) by 364 days.

(21) Appl. No.: 12/832,499

(22) Filed: Jul. 8, 2010

(65) Prior Publication Data

US 2011/0007858 A1    Jan. 13, 2011

(30) Foreign Application Priority Data

Jul. 9, 2009  (IT) ............................. VA2009A0047

(51) Int. Cl.
*H03D 1/00* (2006.01)
(52) U.S. Cl.
USPC .......................................... 375/343; 375/368
(58) Field of Classification Search
USPC .................... 375/232, 316, 343, 340, 355
See application file for complete search history.

(56) References Cited

U.S. PATENT DOCUMENTS

| | | | | |
|---|---|---|---|---|
| 5,432,821 A | * | 7/1995 | Polydoros et al. | 375/340 |
| 5,475,710 A | * | 12/1995 | Ishizu et al. | 375/232 |
| 5,619,507 A | * | 4/1997 | Tsuda | 370/350 |
| 5,870,444 A | | 2/1999 | Mynett et al. | 375/368 |
| 5,995,515 A | * | 11/1999 | Suzuki | 370/465 |
| 6,246,735 B1 | * | 6/2001 | Sano et al. | 375/364 |
| 6,466,566 B1 | * | 10/2002 | De Gaudenzi et al. | 370/342 |
| 6,480,559 B1 | | 11/2002 | Dabak | 375/368 |
| 6,493,360 B1 | * | 12/2002 | Nishimura | 370/514 |
| 6,505,220 B1 | * | 1/2003 | Ikeda | 708/212 |
| 6,625,463 B1 | * | 9/2003 | Xiao et al. | 455/502 |
| 2004/0190663 A1 | | 9/2004 | Carsello et al. | 375/354 |
| 2005/0036573 A1 | * | 2/2005 | Zhang et al. | 375/343 |
| 2005/0175123 A1 | | 8/2005 | Gurney et al. | 375/324 |

(Continued)

FOREIGN PATENT DOCUMENTS

| | | |
|---|---|---|
| IT | MI2008A002304 | 12/2008 |
| WO | 93/11605 | 6/1993 |
| WO | 02/062005 | 8/2002 |

OTHER PUBLICATIONS

Chen et al., "*A Fast Algorithm for Choosing Frame Synchronization Unique Word*", IEEE Xplore, Nov. 1998, vol. 6, pp. 3437-3442.

(Continued)

*Primary Examiner* — Emmanuel Bayard
(74) *Attorney, Agent, or Firm* — Allen, Dyer, Doppelt, Milbrath & Gilchrist, P.A.

(57) ABSTRACT

The recognition of a frame synchronization pattern or unique word of a received signal may be enhanced using a data-aided estimator of the signal-to-noise ratio (SNR) together with a correlation detector of the unique word to be received. Detecting a frame synchronization pattern or a unique word in a received signal, the SNR is estimated on the received signal with a data-aided SNR estimator using the unique word to be received. If the estimated SNR exceeds a certain threshold, an eventual recognition of the unique word established by a correlation correlator of the receiver is considered reliable. Comparing the SNR with the threshold may be carried out either before or after the correlator has processed the unique word.

10 Claims, 3 Drawing Sheets

U.S. PATENT DOCUMENTS

2008/0121719 A1* 5/2008 Knowles et al. ......... 235/462.42
2008/0259904 A1* 10/2008 Wang et al. .................. 370/350
2010/0166101 A1 7/2010 Bisaglia et al. ............... 375/283

OTHER PUBLICATIONS

Nagaraj et al., "*On Preamble Detection in Packet-Based Wireless Networks*", IEEE, Jun. 2006, pp. 476-480.

Pauluzzi et al., "*A Comparison of SNR Estimation Techniques for the AWGN Channel*", IEEE, vol. 48, No. 10, Oct. 2000, pp. 1681-1691.

Roddy, "*Satellite Communications*", $3^{rd}$ edition, McGraw Hill, 2006, p. 450.

Schrempp et al., "*Unique Word Detection in Digital Burst Communications*", IEEE, vol. Com-16, No. 4, Aug. 1968, pp. 597-605.

Sasai et al., "Unique word detection using quantized soft-decision data", Electronics and Communications Japan, Mar. 2007, vol. 77, pp. 80-93.

\* cited by examiner

METHOD OF DETECTING A FRAME SYNCHRONIZATION PATTERN OR UNIQUE WORD IN A RECEIVED DIGITAL SIGNAL

FIELD OF THE INVENTION

The invention relates to communication systems, and, more particularly, to a method of detecting a frame synchronization pattern or unique word in a received signal.

BACKGROUND OF THE INVENTION

Throughout this document the term "frame" will denote the sequence of symbols that includes the useful part of the transmitted data. To correctly demodulate a received signal, a receiver must recognize the beginning of the useful part. Typically, the transmitter inserts before the data bits two pre-determined bit-sequences referred as "preamble" and "unique word" (UW). The preamble sequence is mainly used for symbol, clock synchronization or carrier recovery purposes, while the UW is used to obtain frame synchronization.

Recognition or detection of a known sequence of bits contained in the received stream is generally carried out via a correlator. Typically, the correlator is hard input based, although also soft input based correlator approaches exist. In the case of a hard correlator, the received signal, after passing through an analog front end (AFE) that includes, among others, an amplifier and an analog to digital converter (ADC), is hard demodulated and correlated with the pre-stored UW: if the output of the correlator exceeds a pre-determined correlation threshold, frame synchronization is declared. A problem of such a scheme is that if the chosen correlation threshold is too high, i.e. if a large number of matches is required between the pre-stored UW and the received signal, the probability of missed detection in the presence of noise is high. Conversely, if the correlation threshold is too low, the probability of false detection grows and false alarms are generated with high frequency. For example, see W. Schrempp and T. Sekimoto, "Unique word detection in digital burst communications," IEEE Transactions on Communication Technology, vol. 16, pp. 597-605, August 1968.

Several strategies have been conceived in the past by the research community to limit the missed and false UW detections. For instance, methods to generate UW bit sequences with a pre-fixed length L and good auto-correlation and cross-correlation properties have been devised, such as discussed in M. Chen, K. C. Chua and Q. L. Ding, "A fast algorithm for choosing frame synchronization unique word," IEEE GLOBECOM 98, vol. 6, pp. 3437-3442, November 1998. Furthermore, among the techniques focusing on the computation of the correlation, the patent by Dabak (A. J. Dabak, "Frame synchronization with Unique-Word dependent filter coefficients," U.S. Pat. No. 6,480,559, Nov. 1998), in which a method is disclosed for reducing the "sidelobes" of the correlation output by substituting, at the receiver side, the pre-stored UW with a sequence that is mathematically derived from the original UW and the preamble. Also, the article by Sasai et al. (H. Sasai, M. Takeyabu, K. Minomo, F. Takahata and J. Ogikubo, "Unique word detection using quantized soft-decision data," Electronics and Communications in Japan, vol. 77, pp. 80-93, March 2007), suggests to substitute the hard input based correlator with a soft one: in this case, after the AFE, the Euclidean distance between the pre-stored modulated UW and the soft values of the received sequence is computed. These approaches do not completely address the problem of limiting the missed and false UW detections.

A different approach (adopted for example in T. M. Mynett, B. A. R. Kobari and R. C. Hyers, "Method and apparatus for performing very fast message synchronization," U.S. Pat. No. 5,870,444, April 1996) includes transmitting the same UW repeatedly. The use of repeated UWs clearly reduces the missed detections, since the receiver will probably detect at least one of the transmitted UWs by a correlation process. By checking the presence of more than one UW, also the false detections are limited. Moreover, the repetition of the same UW sequence, instead of increasing the UW length, limits the dimension of the correlator at the receiver. However, the achievements of this technique are obtained at the cost of a transmission overhead that may be undesirable in many applications.

Another method that introduces redundancy in transmission coding, see P. Febvre and P. Fines, "Communication method and apparatus", WO 02/062005, August 2002, where, at the transmitter, the UW is coded using a systematic code. Due to the systematic nature of the code, the UW keeps its good auto-correlation properties. At the receiver, the UW detection is divided into two steps. In the first step, a classic correlation detector computes the correlation between the received sequence and the stored UW. If a pattern is recognized to be the UW, the second step is performed: the receiver demodulates the received signal and uses its error correction power to determine if the output of the UW detector is a true or false detection. If the communication system uses a powerful error correcting code (for example a turbo code), false detections are reduced.

Besides the problem of the introduced redundancy, a drawback of this method is the need of coding the UW. In fact, if the transmission system does not include a coding block, a specifically designed code for the UW bits must be envisaged. Conversely, if the system allows coding for the data packet, certain codes should be adapted to include also the UW: for instance, in the case of turbo codes, the turbo interleaver length must be enlarged.

Another detection scheme for reducing false detections is adopted in many time division multiple access (TDMA) satellite systems. In TDMA satellite systems, the transmission is structured in frames that are consecutively transmitted. Each frame contains a sequence of a certain number of sub-frame fields generally referred as bursts. The bursts sequence is constituted by a first reference burst followed by station bursts associated to different ground stations. Each burst (reference or station) contains an identifying UW. When the first frame is received, the first UW detections are normally performed correlating the received sequence with the pre-stored UWs; for the successive frames, a time window may be formed around the expected time of arrival for the UWs such that the correlation detectors are only in operation for the window period (e.g. D. Roddy, "Satellite communications", p. 450, McGraw-Hill 2006). This procedure does not avoid false detections during the first frame UW acquisition or implies an acquisition delay for verifying whether other UWs follow.

The idea of activating the UW correlator circuit depending on the estimated power of the received signal has been suggested in O. Nishimura, "Reception synchronization circuit, receiver using the same, and digital communication system," U.S. Pat. No. 6,493,360, December 1998. This approach reduces false detections, since the correlator is switched off for a very long time. However, it implies the need of a circuitry with two thresholds that must dynamically evolve to obtain the desired missed and false detections. Moreover, the received signal power is not directly linked to the system performance, which determines the missed detection probability, thus, the threshold setup is not simple.

SUMMARY OF THE INVENTION

It has been found that the recognition of a frame synchronization pattern or unique word of a received signal may be enhanced using a data-aided estimator of the signal-to-noise ratio (SNR) together with a correlation detector of the unique word to be received. Incorrect recognitions of the unique word in the received signal by the correlation detector occur substantially when noise pulses of the transmission channel match partially with the true UW and so may be erroneously recognized as pulses of the unique word.

The inventors have found that conditions that may lead to the occurrence of this phenomenon may be identified using a data-aided SNR estimator, that is a device actually present in many transceivers only for monitoring the quality of a transmission channel and, eventually, for choosing the most appropriate type of modulation for transmitting digital data over it. According to the present method of detecting a frame synchronization pattern or a unique word in a received signal, the SNR is estimated on the received signal with the data-aided SNR estimator using the unique word to be received. If the estimated SNR exceeds a certain threshold, an eventual recognition of the unique word established by a correlation detector (or more briefly "correlator") of the receiver is considered reliable. The step of comparing the SNR with the threshold may be carried out either before or after the correlator has processed the unique word.

According to an embodiment, the probability density functions of the output of the SNR estimator when false unique word recognitions by the correlator occur and of the output of the SNR estimator when the SNR equals a predetermined value are estimated and the threshold is determined as the SNR at which the probability density functions assume respective pre-established values. According to an embodiment, the threshold may be determined as the SNR value at which the two probability density functions intersect. According to an embodiment, the two probability density functions are Gaussian.

DETAILED DESCRIPTION OF THE PREFERRED EMBODIMENTS

A typical requisite in the realization of modern communication systems is to guarantee a certain quality of service (QoS). For example, the QoS could include providing, for a given information bit rate, a certain bit error rate (BER) in the presence of some channel and noise conditions. The block of a communication transceiver that most commonly is implemented to monitor the quality of the communication line is the signal to noise ratio (SNR) estimator. SNR estimations may be used at the transmitter side to choose an appropriate modulation (for example by selecting among binary phase shift keying BPSK, quadrature phase shift keying QPSK or quadrature amplitude modulation QAM constellations), a suitable coding method (if more than one encoding procedure is supported) and code rate to achieve the prescribed QoS. The SNR estimators may be subdivided into two categories: "data-aided" estimators and "non data-aided" estimators: the former operate on a known sequence, the latter act on an unknown sequence. In discussing the present invention, data-aided estimators are considered.

The transmitted packet generally includes a preamble, a UW and the useful data: the sequences, which a priori are known to the receiver, are the preamble and the UW. Since, as already mentioned, the preamble is used for synchronization purposes, a preamble-aided SNR estimator could have a large variance that makes its output unreliable. However, a UW-aided SNR estimator may be efficiently implemented thus providing small variance reliable SNR estimates.

According to the present approach, the output of a UW-aided SNR estimator is used at the receiver side for detecting a frame synchronization or unique word in a received signal. In practice, any eventual detection of the unique word by the correlator of the receiver is invalidated as long as the estimated SNR does not surpass a pre-established threshold.

The skilled artisan will appreciate that the present approach may not require additional resources. Indeed the SNR estimator is already present in most modern communication systems and its output is re-employed at the receiver side. Moreover, it is not strictly necessary to add redundancy to the UW in transmission, although it is also possible to insert UW coding or to repeat the UW, with multiple UW-aided SNR estimates, to further increase detection robustness. As it will be evident from the following description, the proposed method also allows a flexible realization of the UN correlator, and in practice numerous known correlator architectures may be used.

Figure 1:
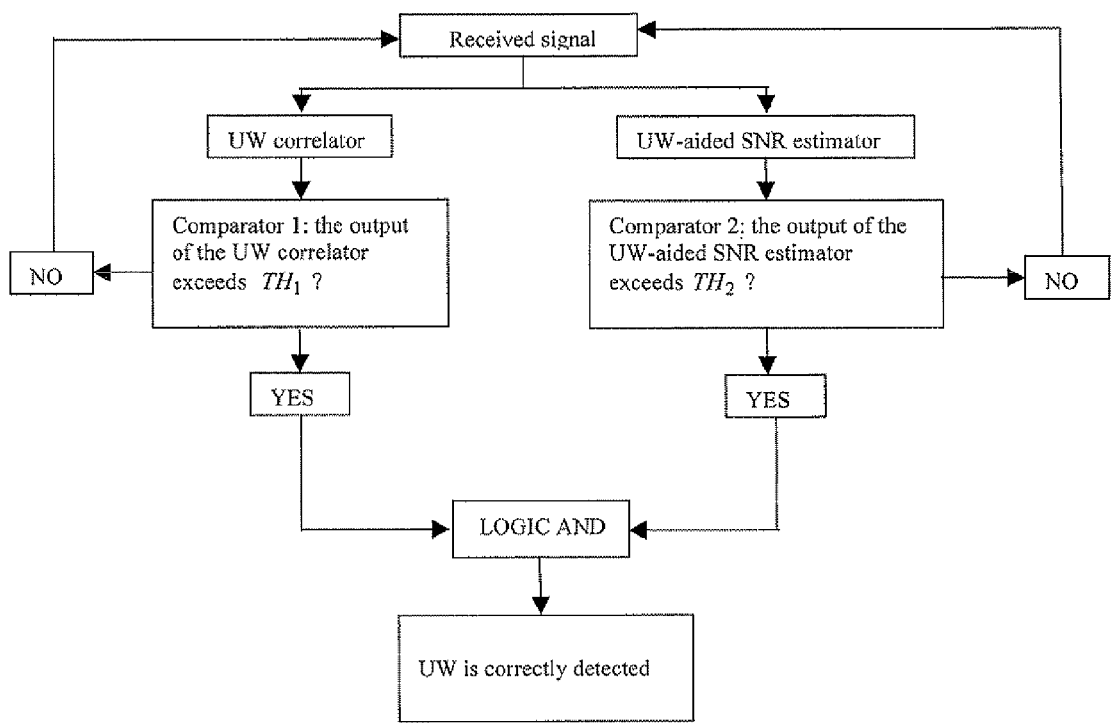
FIG. 1 is a block diagram that illustrates an embodiment of the method in accordance with features of the present invention.

FIG. 1 is a flow chart of an embodiment of the present approach. According to this embodiment, the detection of a unique word in a received signal is assessed only if at the same time the signal generated by the correlator surpasses a threshold $TH_1$ and the signal generated by the SNR estimator surpasses a threshold $TH_2$.

Figure 2:
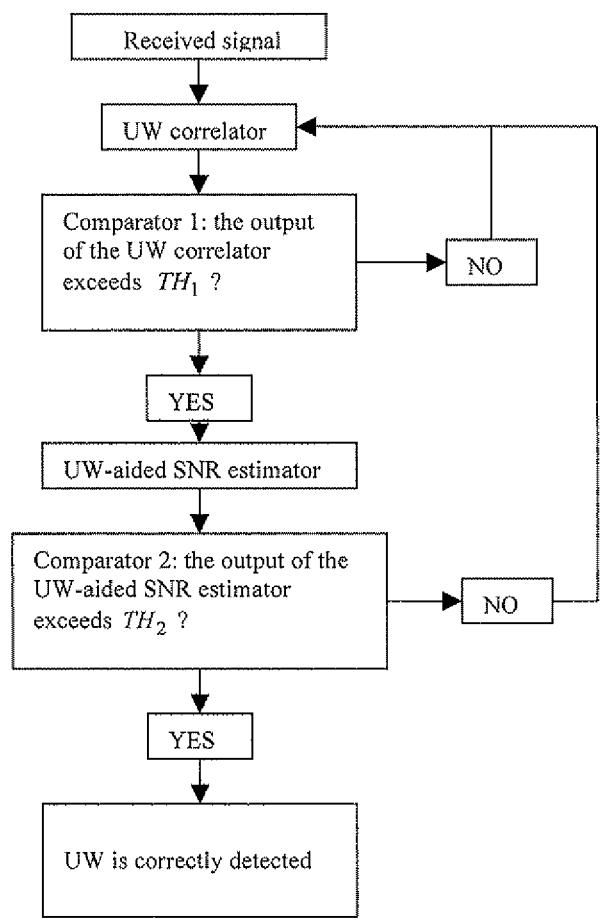
FIG. 2 is a block diagram that illustrates another embodiment of the method in accordance with features of the present invention.

FIG. 2 illustrates a particular embodiment of the present approach. According to the embodiment illustrated in FIG. 2, the received signal is passed to the UN correlator block. The output of the UN correlator is sent to a first comparator. If the output of the correlation exceeds a threshold $TH_1$, then the UN-aided SNR estimator estimates the SNR and sends the estimated value to a second comparator. If the estimated SNR exceeds a threshold $TH_2$, then the UN is assumed to be correctly detected and frame synchronization may be established. In this procedure, if the output of the UN correlator does not exceed the threshold $TH_1$, the UN-aided SNR estimator block is not enabled. The UW correlator block is always active until frame synchronization is declared.

Those skilled in the art will appreciate that the proposed method combines the UN correlator and the UW-aided SNR estimator, and the particular embodiment of FIG. 2 does not restrict the field of applicability of the present invention. For instance, if the energy consumption of the UN-aided SNR estimator block is smaller than that of the UW correlator block, the position of the just mentioned blocks may be inverted and the UN correlator block may be enabled only once the estimated SNR exceeds the second threshold $TH_2$. Alternatively, if needed, both blocks may be kept on.

As those skilled in the art will appreciate, provided that the implemented SNR estimator has acceptable performance in terms of mean and variance of the estimated SNR, the proposed method does not need a specifically designed SNR estimator. For instance, in the context of a communication system using an M-DPSK modulation, a very robust SNR estimator, that resolves the problems of frequency offsets is disclosed in the Italian patent application No. MI08A002304 filed on Dec. 23, 2008. Other suitable data-aided SNR estimators are disclosed in D. R. Pauluzzi and N. C. Beaulieu, "A comparison of SNR estimation techniques for the AWGN channel," IEEE Transactions on Communications, vol. 48, pp. 1681-1691, October 2000.

To let the UW-aided SNR estimator reduce as much as possible false UW correlator detections, the threshold $TH_2$ should be properly selected. The threshold $TH_2$ may be determined off-line using only the communication system performance and the SNR estimator performance.

According to yet another embodiment, the probability density function of the output of the SNR estimator when false unique word recognitions by the UW correlator block occur and the probability density function of the output of the SNR estimator when the SNR equals a predetermined value are estimated. The threshold $TH_2$ is determined as the value of the SNR at which the probability density functions attain respective values. For example, the threshold $TH_2$ may be the value of the SNR at which the two probability density functions intersect.

As usual in the field of communication systems, these probability density functions may be modeled as Gaussian functions, though any other function adapted to describe the probability density function of the output of the SNR estimator when false unique word recognitions by the UW correlator block occur or the probability density function of the output of the SNR estimator when the SNR equals a predetermined value may be used.

Figure 3:
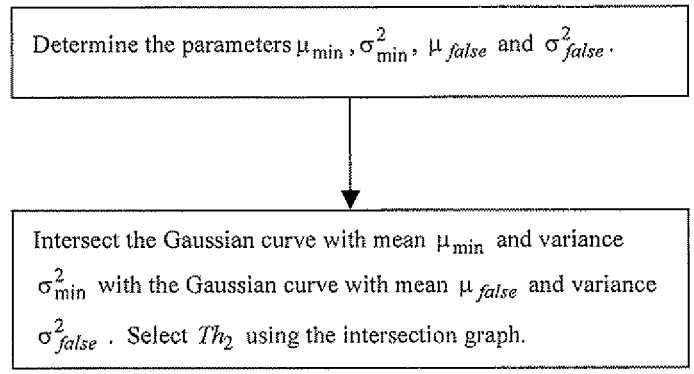
FIG. 3 is a flowchart that illustrates an example of determining the threshold $TH_2$ for the methods of FIGS. 1 and 2.

According to the exemplary embodiment illustrated in the flow chart of FIG. 3, in a first step four parameters $\mu_{min}$, $\sigma_{min}^2$, $\mu_{false}$ and $\sigma_{false}^2$ are determined. The parameter $\mu_{min}$ represents the minimum SNR at which the used communication system is supposed to guarantee a pre-fixed QoS. This value is in general available in the design of the communication system and is typically the SNR at which a prescribed BER is obtained with the most robust combination of the available modulations and coding on a reference channel (for example an additive white Gaussian noise (AWGN) channel).

For example, in an M-PSK un-coded system that should guarantee a BER-$10^{-4}$, the best performance is evidently obtained with M-2, i.e. using the BPSK, and $\mu_{min}$ is the SNR at which the un-coded BPSK modulation achieves the prescribed BER on the chosen reference channel.

As another example, if an M-DPSK system, that should guarantee a BER-$10^{-3}$, is optionally encoded with a convolutional code with a mother code rate and some derived code rates obtained with puncturing, the best performance is obtained with the 2-DPSK modulation encoded with the mother code rate convolutional code and $\mu_{min}$ is the SNR at which this combination of modulation and coding achieves the desired BER-$10^{-3}$ on the chosen reference channel.

The parameter $\sigma_{min}^2$ is the variance of the UW-aided SNR estimator when the reference channel experiences a SNR equal to $\mu_{min}$. The value of and $\mu_{min}$ and $\sigma_{min}^2$ may be obtained through software simulations or, if the reference channel is associated to a particular on-field or lab configuration, through measurements by using, for example, FPGA prototypes of the designed communication system or even the actual communication receiver, provided that the threshold $TH_2$ is left programmable.

The parameters $\mu_{false}$, and $\sigma_{false}^2$ are, respectively, the mean and the variance of the SNR that is estimated by the UW-aided SNR estimator when a false correlator detection takes place. Again, the values of $\mu_{false}$ and $\sigma_{false}^2$ may be obtained by software simulations or by collecting statistics based on on-field or lab measurements.

Figure 4:
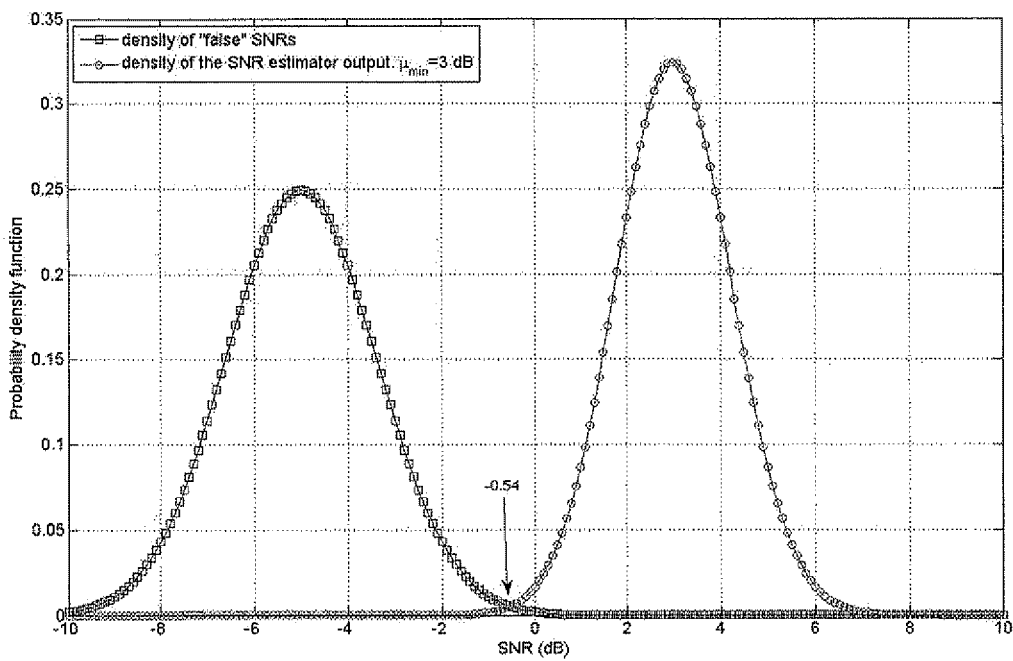
FIG. 4 is an exemplary graph representation of typical probability density functions for the estimated SNRs for the methods of FIGS. 1 and 2.

In FIG. 4, a typical situation in the context of the present invention is reported: in this example, the minimum SNR at which the communication system guarantees the QoS is $\mu_{min}$=3 dB. In this example, the UW-aided SNR estimates in the case of false detections concentrate on $\mu_{false}$=−5 dB. This fact may be explained by observing that, when a false detection by the correlator occurs, the UW-aided SNR estimator does not use the true UW to perform the SNR estimate and interprets the false UW sequence as a true UW strongly corrupted by noise.

Once the values of $\mu_{min}$, $\sigma_{min}^2$, $\mu_{false}$ and $\sigma_{false}^2$ have been determined, the threshold $TH_2$ is chosen by determining the probability density functions using the parameters determined on the first step. The threshold $TH_2$ for comparing the SNR may be chosen, for example, as the SNR greater than $\mu_{false}$ and lower than $\mu_{min}$ at which the two curves intersect. In the exemplary graph of FIG. 4, $TH_2$=−0.54 dB. A tradeoff between missed and false detections is determined: this choice permits to discriminate, with a probabilistic approach, the false detections, minimizing at the same time the missed detections when noise conditions allow the communication system to achieve a desired QoS.

Moreover, the just described method does not introduce a time delay to discover a false UW correlator detection: this fact allows the receiver to instantaneously wait for the correct UW, thus reducing the missed detections. As a further consequence, the proposed method may guarantee a quasi-absence of time delay in declaring frame synchronization.

Another aspect of the present approach is the possibility of automatically discarding the frames associated with very low SNRs: in fact, for these frames, demodulation is unnecessary since, with high probability, the reconstructed transmitted bits present several errors. Referring again to the example of FIG. 4, it is evident that, with the chosen $TH_2$, SNR conditions greater than 3 dB make even more reliable the discrimination between false and true UW correlator detections.

As those skilled in the art will notice, the aforementioned choice of $TH_2$ is not the only possible one and users could decide to balance the missed and false detection probabilities in a different way. For instance, in the example of FIG. 4, it may be decided to further limit the missed detection setting $TH_2$=−2 dB, but, clearly, false detections increase considerably. As another example, it may be decided to further limit false detections by setting $TH_2$=1 dB: in this case, at low SNRs, an increase of the missed detections must be accepted.

The threshold $TH_2$ may be adjusted also depending on the application requirements: if, for example, the output of the UW-aided SNR estimator is quantized only in integer values because the application requires only an indicative monitoring of the line quality, the threshold $TH_2$ must be changed accordingly. In the example of FIG. 4, quantization on integer values would imply that the estimated SNRs in the intervals [−1,−0.5] and [−0.5,0] have collapsed respectively into −1 dB and 0 dB. Hence, the procedure of FIG. 4 could use $TH_2$=−1 dB or, alternatively, a comparator block must be embedded into the UW-aided SNR estimator before the quantization, thus creating a new output of the block besides the estimated SNR.

The skilled artisan will perceive that the probabilities of false and missed detection are also controlled by the probabilities of false and missed UW correlator detection. This is achieved by appropriately setting the first threshold $TH_1$. Depending on the correlator implementation, it is possible to compute false and missed UW correlator detection probabilities. As those skilled in the art will notice, in most cases, prior art literature already teaches how to accomplish this task.

Another aspect of the present approach involves the fact that if the immunity to false detection achieved due to the UW-aided estimator is satisfying, the UW correlation threshold $TH_1$ could be diminished to reduce the missed detections. Moreover, to face particular channel conditions, a possible choice is to let the user free to adjust both thresholds $TH_1$ and $TH_2$.

That which is claimed is:

1. A method of detecting a frame synchronization pattern in a signal received by a receiver, the method comprising:
   processing the received signal with a unique word correlator to generate a first signal representative of a correlation between received patterns and the frame synchronization pattern;
   processing the received signal with a data-aided signal-to-noise ratio (SNR) estimator to generate a second signal representative of the SNR estimated on the received signal;
   comparing the first and second signals respectively with first and second thresholds; and
   determining detection of the frame synchronization pattern based upon the comparing.

2. The method of claim 1, further comprising determining the second threshold by:
   estimating a probability density function of the SNR estimated by the SNR estimator when false recognition of the frame synchronization pattern by the unique word correlator occur;
   estimating a probability density function of the SNR estimated by the SNR estimator when the SNR on the received signal equals a first value; and
   setting the second threshold as the SNR at which the probability density functions assume respective second values.

3. The method of claim 2, wherein the probability density functions comprise Gaussian probability density functions.

4. The method of claim 3, wherein determining the second threshold further comprises:
   establishing a minimum level $\mu_{min}$ of SNR;
   estimating a variance $\sigma_{min}^2$ of the data-aided SNR estimator when the SNR equals the minimum level;
   estimating characteristic values $\mu_{false}$ and $\sigma_{false}^2$ of the mean and of the variance of the SNR estimated by the data-aided SNR estimator when the first signal generated by the unique word correlator exceeds the first threshold when the frame synchronization pattern has not been transmitted; and
   determining the second threshold as the SNR value at which a first Gaussian probability density function having mean and variance equal to the minimum level $\mu_{min}$ and to the variance $\sigma_{min}^2$ of the data-aided SNR estimator, respectively, intersects a second Gaussian probability density function having a mean and variance equal to the mean $\mu_{false}$ and variance $\sigma_{false}^2$ of the SNR, respectively.

5. The method of claim 1, wherein determining detection of the frame synchronization pattern is based upon the first and second signals respectively exceeding the first and second thresholds.

6. A receiver for processing a received signal and comprising:
   a unique word correlator configured to generate a first signal representative of a correlation between received patterns of the received signal and a frame synchronization pattern;
   a data-aided signal-to-noise ratio (SNR) estimator configured to generate a second signal representative of the SNR estimated on the received signal; and
   a comparator configured to respectively compare the first and second signals with first and second thresholds so that determining detection of the frame synchronization pattern is based thereon.

7. The receiver of claim 6, wherein the second threshold is based upon an estimation of a probability density function of the SNR estimated by the SNR estimator when false recognition of the frame synchronization pattern by the unique word correlator occur, and an estimation of a probability density function of the SNR estimated by the SNR estimator when the SNR on the received signal equals a predetermined value.

8. The receiver of claim 7, wherein the probability density functions comprise Gaussian probability density functions.

9. The receiver of claim 8, wherein the second threshold is further based upon:
   establishing a minimum level $\mu_{min}$ of SNR;
   estimating a variance $\sigma_{min}^2$ of the data-aided SNR estimator when the SNR equals the minimum level;
   estimating characteristic values $\mu_{false}$ and $\sigma_{false}^2$ of the mean and of the variance of the SNR estimated by the data-aided SNR estimator when the first signal generated by the unique word correlator exceeds the first threshold when the frame synchronization pattern has not been transmitted; and
   determining the second threshold as the SNR value at which a first Gaussian probability density function having mean and variance equal to the minimum level $\mu_{min}$ and to the variance $\sigma_{min}^2$ of the data-aided SNR estimator, respectively, intersects a second Gaussian probability density function having a mean and variance equal to the mean $\mu_{false}$ and variance $\sigma_{false}^2$, respectively.

10. The receiver of claim 6, wherein the comparator is configured to respectively compare the first and second signals with first and second thresholds so that determining detection of the frame synchronization pattern is based upon the first and second signals respectively exceeding the first and second thresholds.

* * * * *